United States Patent [19]

Baldwin et al.

[11] 4,212,117
[45] Jul. 15, 1980

[54] SYSTEM OF INTERACTIVE BLOCKS

[75] Inventors: Blair F. Baldwin; Deborah Stoddard, both of New York, N.Y.

[73] Assignee: Baldwin, Stoddard & Company, New York, N.Y.

[21] Appl. No.: 11,072

[22] Filed: Feb. 12, 1979

[51] Int. Cl.² ............................................. G09B 19/02
[52] U.S. Cl. ...................................... 35/31 C; 35/9 R
[58] Field of Search .......................... 35/9 R, 31 C, 70

[56] References Cited

U.S. PATENT DOCUMENTS

| 1,974,901 | 9/1934 | Stadler | 35/9 R X |
| 3,504,449 | 4/1970 | Kobler | 35/31 C X |
| 3,571,950 | 3/1971 | Walker | 35/31 C |
| 3,696,533 | 10/1972 | Mortensen | 35/70 |

Primary Examiner—Harland S. Skogquist
Attorney, Agent, or Firm—Burgess, Ryan and Wayne

[57] ABSTRACT

A system of children's blocks for teaching arithmetic, comprising various types of arithmetic operation blocks, and a number of answer blocks. Each block is dimensioned in accordance with a predetermined numerical value. Addition blocks contain a linearly slidable rod having a portion protruding from the block a distance corresponding to a numerical value printed on the block. When two or more addition blocks are aligned, the rods of said blocks push against each other, to cause the rod of one of the end blocks to protrude a distance corresponding to the sum of the values of the mutually engaged blocks. An answer block contains an internal flag member and a visible indicator positioned so that an indication of correct result is displayed only when the protruding portion of the rod of an engaged addition block corresponds to a value associated with the answer block utilized. Thus the child can successfully engage addition blocks with an answer block only when the value of the answer block corresponds to the sum of the values of the addition blocks. Subtraction is taught by the use of minuend blocks having non-movable rods of lengths corresponding to numerical values printed on the blocks extending therefrom, and subtrahend blocks having holes therein of predetermined length (corresponding to values to be subtracted) between opposed parallel surfaces thereof. A minuend block can be engaged with one or more subtrahend blocks and an answer block only when the values of said blocks correspond to a correct arithmetic statement. Multiplication and division blocks are of the same form as addition and subtraction blocks respectively, but have dimensions logarithmically proportional to the corresponding numerical values. The same answer blocks are used for all four arithmetic processes.

13 Claims, 16 Drawing Figures

SYSTEM OF INTERACTIVE BLOCKS

This application relates to a system of interactive blocks for teaching arithmetic.

Numerous educational toys and schemes are known in the art for teaching arithmetic. Among these are various games and tutorial types of electronic calculators. However, there is need for a relatively simple system in the nature of a toy which can be utilized for teaching arithmetic to pre-school children. A preferable type of toy for this purpose is one in the form of various blocks, since pre-school children are generally accustomed to playing with blocks, and the blocks are safe and do not require a high degree of mechanical coordination skill for assembly.

Accordingly, an object of the present invention is to provide a system of such blocks which can be assembled in accordance with the rules of arithmetic.

As herein described, there is provided a system of interactive blocks for teaching arithmetic, comprising: a plurality of addend blocks each having: first and second spaced parallel exterior surfaces and a hole extending through said block between said surfaces; an elongated rod mounted within said hole for linear movement in a direction transverse to said surfaces; means for limiting the movement of said rod so that when one end of said rod is adjacent said first surface the other end thereof extends outwardly from said second surface a predetermined distance linearly proportional to a first numerical value, and so that said one end of said rod is movable only between said surfaces; a plurality of answer blocks each having: a pair of spaced exterior surfaces and an elongated recess communicating with a selected one of said surfaces; a displaceable flag member disposed in said recess and mounted for movement in response to entry of one of said rods a given distance into said recess linearly proportional to a given numerical value; visible means for indicating the position of said flag member; means for preventing said one rod from extending into said recess a distance greater than said given distance; and indexing means on said first, second and selected surfaces of said addend and answer blocks respectively for maintaining adjacent ones of said surfaces with the holes and recesses thereof in mutual alignment.

Also herein described is a system of interactive blocks for teaching arithmetic, comprising a plurality of minuend blocks each having an elongated rod extending from a given surface thereof a first predetermined distance linearly proportional to a first numerical value; a plurality of subtrahend blocks each having parallel first and second spaced exterior surfaces and a hole extending through said subtrahend block between said surfaces, the width of said subtrahend block between said surfaces being linearly proportional to a second numerical value; a plurality of answer blocks each having a pair of spaced exterior surfaces and an elongated recess communicating with a selected one of said pair of surfaces; a displaceable flag member disposed in said recess and mounted for movement in response to entry of one of said rods a given distance into said recess linearly proportional to a given numerical value; visible means for indicating the position of said flag member; means for preventing said one rod from extending into said recess a distance greater than said given distance; and indexing means on said given, first, second and selected surfaces of said minuend, subtrahend and answer blocks respectively for maintaining adjacent ones of said surfaces with the rods, holes and recesses thereof in mutual alignment.

Also, according to the invention, systems similar to those described above may be utilized for multiplication and division by employing arithmetically-related dimensions which are logarithmically proportional (rather than linearly proportional) to desired numerical values.

Figure 1A:
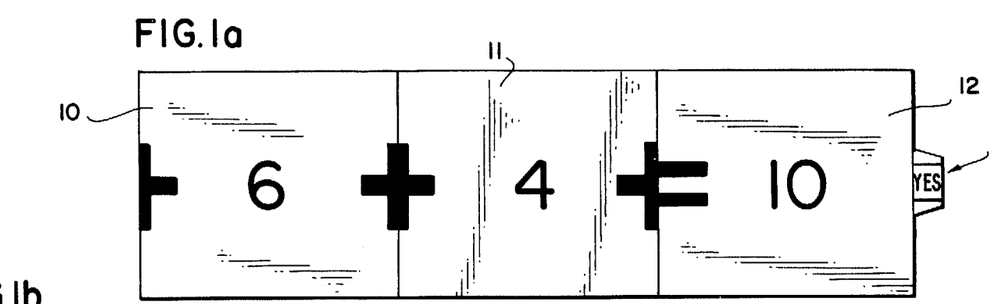
FIGS. 1a to 1e are schematic illustrations showing the manner in which blocks according to the invention are utilized in the teaching of addition.

As illustrated in FIGS. 1a–1e, addition is taught by means of at least two addend blocks 10 and 11, and an answer block 12 selected by the child from one of a plurality of such blocks. Each block has a numerical value associated therewith, which may be designated in roman, arabic, or another notation. The left and right sides of each addend block are imprinted with half of a "plus" symbol, so that a complete "plus" symbol is formed when adjacent addend blocks are placed together. The answer block has an "equals" symbol imprinted at the left side thereof. Preferably, such symbols and numerical values are imprinted on the four surfaces of each block extending between the left and right surfaces thereof as seen in FIG. 1a.

Each of the blocks 10, 11 and 12 has indexing means for maintaining adjacent surfaces of the blocks in mutual alignment. For example, the right side of each addend block has two or more alignment pegs 13 extending therefrom, with corresponding alignment holes in the left surfaces of the addend and answer blocks.

The answer block 12 has a display means 14 extending therefrom, said means displaying either a "yes" or "no" value depending upon the relationship between the arithmetic values associated with the blocks 10, 11 and 12.

As better illustrated in FIGS. 1b to 1e, the blocks 10, 11 and 12 can be placed together by a child with a resulting "yes" display by the means 14 and the blocks with mutually engaged surfaces, only when the imprinted information displayed on the set of blocks so formed corresponds to an arithmetically correct statement.

Figure 1B:
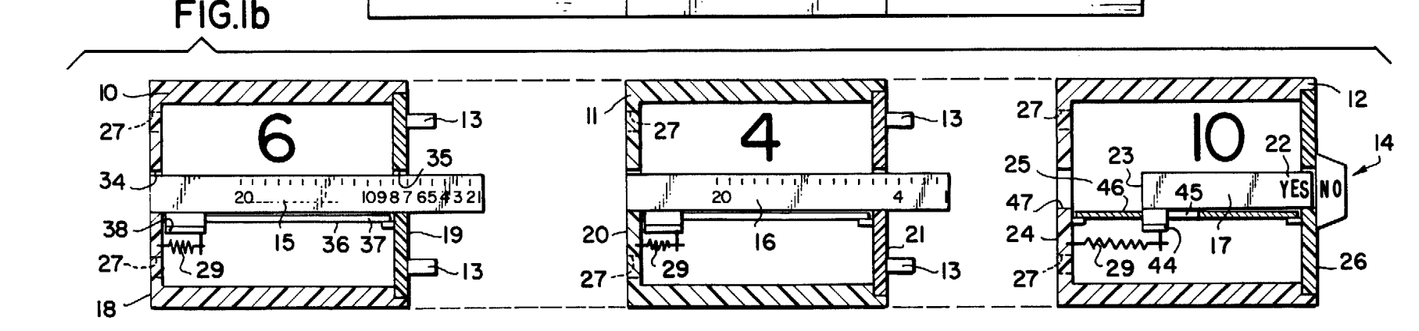

This relationship among the blocks is provided by means of metering rods 15 and 16 mounted for linear transverse sliding movement between the left and right surfaces of the addend blocks 10 and 11 respectively, and a transversely movable sliding flag member 17 mounted within the answer block 12 for movement in a direction transverse to the left and right surfaces thereof, as shown in FIG. 1b.

Means within each of the addend blocks 10 and 11 limits the range of sliding movement of the corresponding rod, so that when the left end of the rod is adjacent the left surface of the block, the right end of the rod protrudes beyond the right surface of the block by a distance which is linearly proportional to the corresponding numerical value. For example, the right end of the rod 15 (when the left end of the rod is adjacent the left surface 18 of the block 10) protrudes beyond the right surface 19 of the block 10 by a distance corresponding to the value "4"; while the right end of the rod 16 (when the left end of said rod is adjacent the left side 20 of the block 11) protrudes beyond the right surface 21 of the block 11 by a distance corresponding to the numerical value "9", i.e., 2¼ times the distance of protrusion of the rod 15.

The range of sliding movement of the flag member 17 of the answer block 12 is limited to a distance roughly corresponding to the width of the "yes" symbol 22 imprinted thereon, said range of movement being approximately equal to a distance corresponding to one arithmetic unit. The left end 23 of the flag member 17 has a left-most position which is disposed a distance from the left side 24 of the answer block 12, corresponding to a numerical value of approximately 12, so that upon insertion of a rod into the cavity 25 of the block 12 having a length corresponding to 13 units, the flag member 17 is pushed to the right so that the "yes" symbol 22 is displayed outside the right surface 26 of the answer block 12.

Figure 1C:
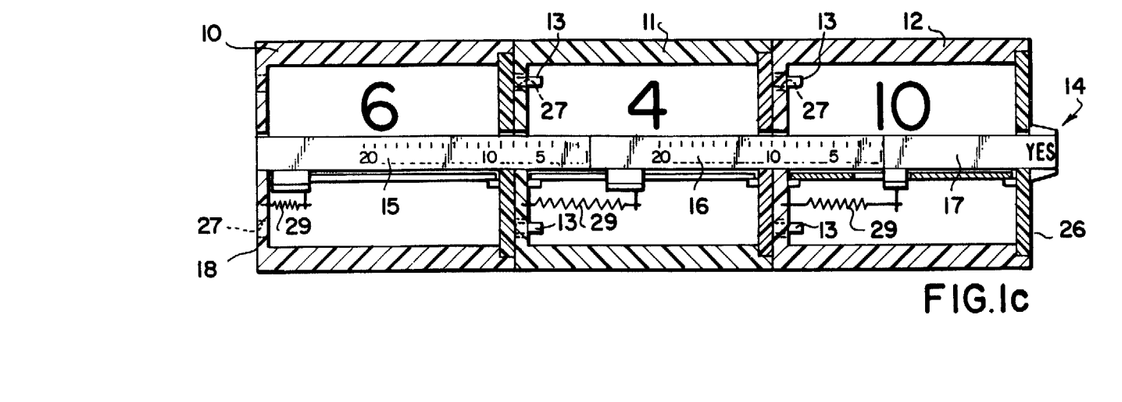
Figure 1D:
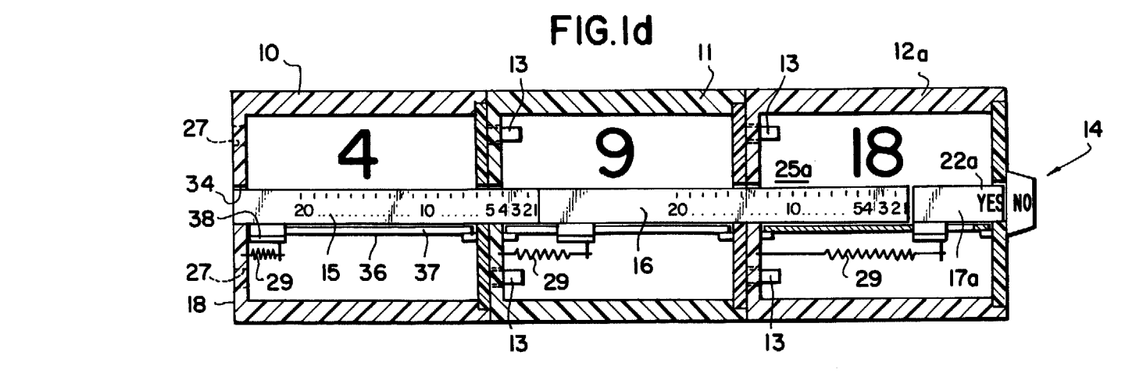

Thus, when the addend blocks 10 and 11 are moved into mutually engaged relationship, i.e. with the surfaces 19 and 20 in mutual contact and the rods 13 aligned with the holes 27, the rod 15 of the block 10 pushes the rod 16 of the block 11 four units to the right, so that the rod 16 now protrudes thirteen units beyond the right surface 21 thereof, as most clearly shown in FIG. 1c. When the assemblage of the blocks 10 and 11 is placed together with the answer block 12, i.e. with the surfaces 21 and 24 in mutual contact, the protruding end of the rod 16 extends into the cavity 25 of the answer block 12, so that the flag member 17 is pushed to the right, causing the "yes" symbol 22 thereof to extend from the right surface 26 of the block 12 to display a "yes" visible verification of the correct engagement of the blocks 10, 11 and 12.

If a child selects an answer block 12a corresponding to a higher numerical value than the sum of the values represented by the blocks 10 and 11, the protrusion of the rods 16 of the block 11 into the cavity 25a of the answer block 12a (which in FIG. 1d corresponds to a numerical value of 18) will be insufficient to reach the left end of the flag member 17a, so that the flag member will not be moved and the "yes" symbol 22a thereon will not be made visible outside the answer block 12a, thus indicating to the child that the arithmetic statement made by the blocks 10, 11 and 12a is incorrect.

Figure 1E:
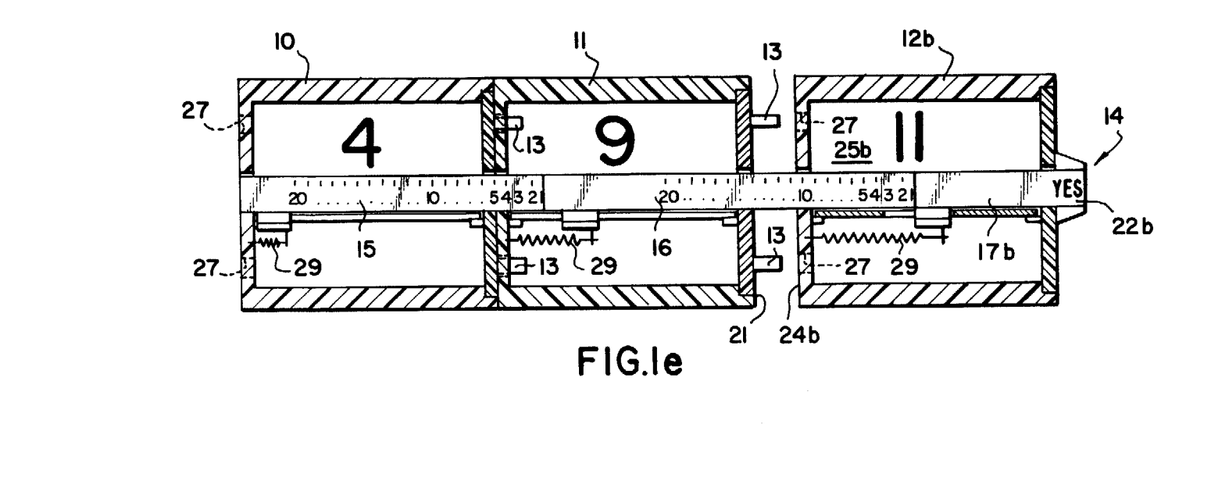

When an answer block 12b is selected which has a numerical value less than the value associated with the sum of the values of the blocks 10 and 11, as illustrated in FIG. 1e, the length of the protruding portion of the rod 16 of the block 11 is greater than the depth of the recess 25b of the answer block 12b, so that although the flag member 17b is pushed to the right (displaying the "yes" symbol 22b), it is impossible to bring the blocks 11 and 12b together so that the adjacent surfaces 21 and 24b thereof are in mutual contact. Thus the child learns that the corresponding arithmetic statement is incorrect, because he cannot bring all three blocks into mutual engagement.

As schematically illustrated in FIG. 1b, springs 29 may be provided within each of the blocks to urge the corresponding rod or flag members toward the left sides of said blocks.

Figure 2A:
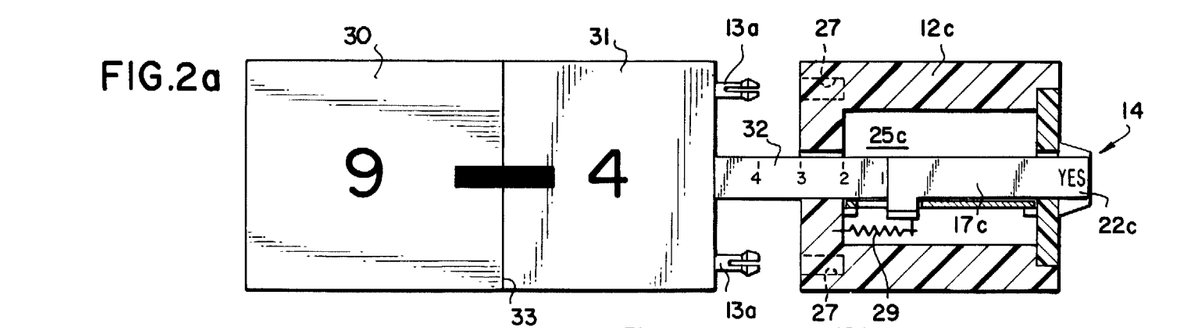
FIGS. 2a to 2c are schematic illustrations showing the manner in which blocks according to the invention are utilized in the teaching of subtraction.
Figure 2B:
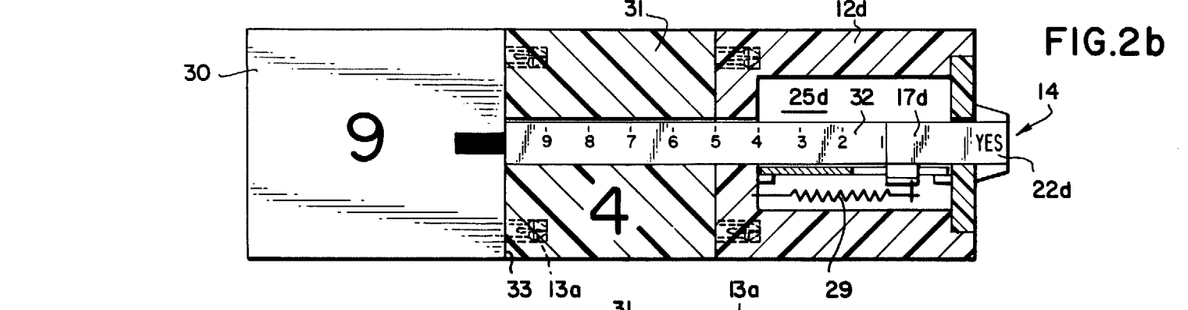
Figure 2C:
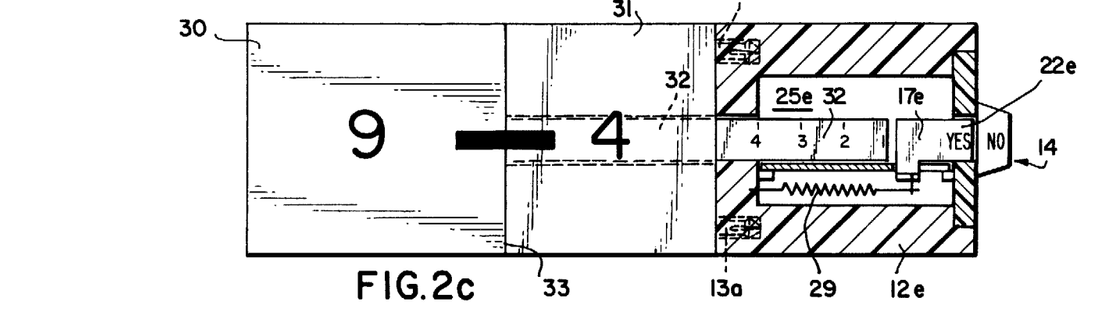

A system of blocks for teaching subtraction is provided in a similar fashion, as illustrated in FIGS. 2a-2c. The blocks can be arranged to form arithmetic subtraction statements by utilization of a minuend block 30, one or more subtrahend blocks 31, and an answer block 12c. The answer blocks utilized in the teaching of subtraction are of the same construction as those utilized in the teaching of addition.

The minnuend block 30 corresponding to a desired numerical value ("9" in FIGS. 2a-2c) has a non-movable rod 32 affixed thereto, and extending a distance linearly proportional to the corresponding numerical value from the right side 33 thereof. The pegs 13a protruding from the surface 33 have resiliently deformable ends of resilient material or spring metal, so that a detent action is provided with respect to the corresponding holes 27 of the subtrahend block 31, to maintain the blocks 30 and 31 in mutually engaged relationship. The subtrahend block 31 has parallel left and right surfaces with a hole extending therebetween to permit the rod 32 of the minuend block 30 to pass therethrough. In effect, the subtrahend block 31 reduces the effective length of the protrusion of the rod 32 by an amount corresponding to the distance between the parallel left and right surfaces of said subtrahend block, which distance which is linearly proportional to a desired numerical value ("4" in FIGS. 2a-2c).

As in the case of the addend blocks 10 and 11, numerical and subtraction symbols are imprinted on the surfaces of the minuend and subtrahend blocks 30 and 31 respectively, said imprinted values corresponding to the related dimensions of the rod 32 and distance between left and right surfaces of the block 31 respectively.

When an answer block 12d (FIG. 2b) is engaged with the minuend and subtrahend blocks 30 and 31, having an associated numerical value corresponding to the difference between the numerical values associated with said minuend and said subtrahend blocks, the length of the effective protrusion of the rod 32 into the cavity 25d of the answer block 12d is sufficient to push the flag member 17d to the right so that the "yes" symbol 22d is displayed, while also permitting the left surface of the answer block 12d to engage the right surface of the subtrahend block 31, thus indicating to the child that he has made a correct arithmetic subtraction statement.

Incorrect assembly of minuend, subtrahend and answer blocks is indicated to the child in the manner similar to that previously described with reference to FIGS. 1a-1e. That is, the attempt to engage an answer block having a lower numerical value than the correct value, as illustrated in FIG. 2a, results in pushing the flag member 17c to the right and displaying the "yes" symbol 22c, but rendering engagement of the left surface of the answering block 12c with the right surface of the subtrahend block 31 impossible.

Similarly, as illustrated in FIG. 2c, the selection of an answering block 12e having a numerical value higher than the difference between the values associated with the blocks 30 and 31 results in a depth of the cavity 25e which is greater than the effective protruding length of the rod 32, so that the rod 32 does not contact the flag member 17e, and the "yes" symbol 22e is not displayed outside the answer block 12e.

Figures 3A, 3B, 4:
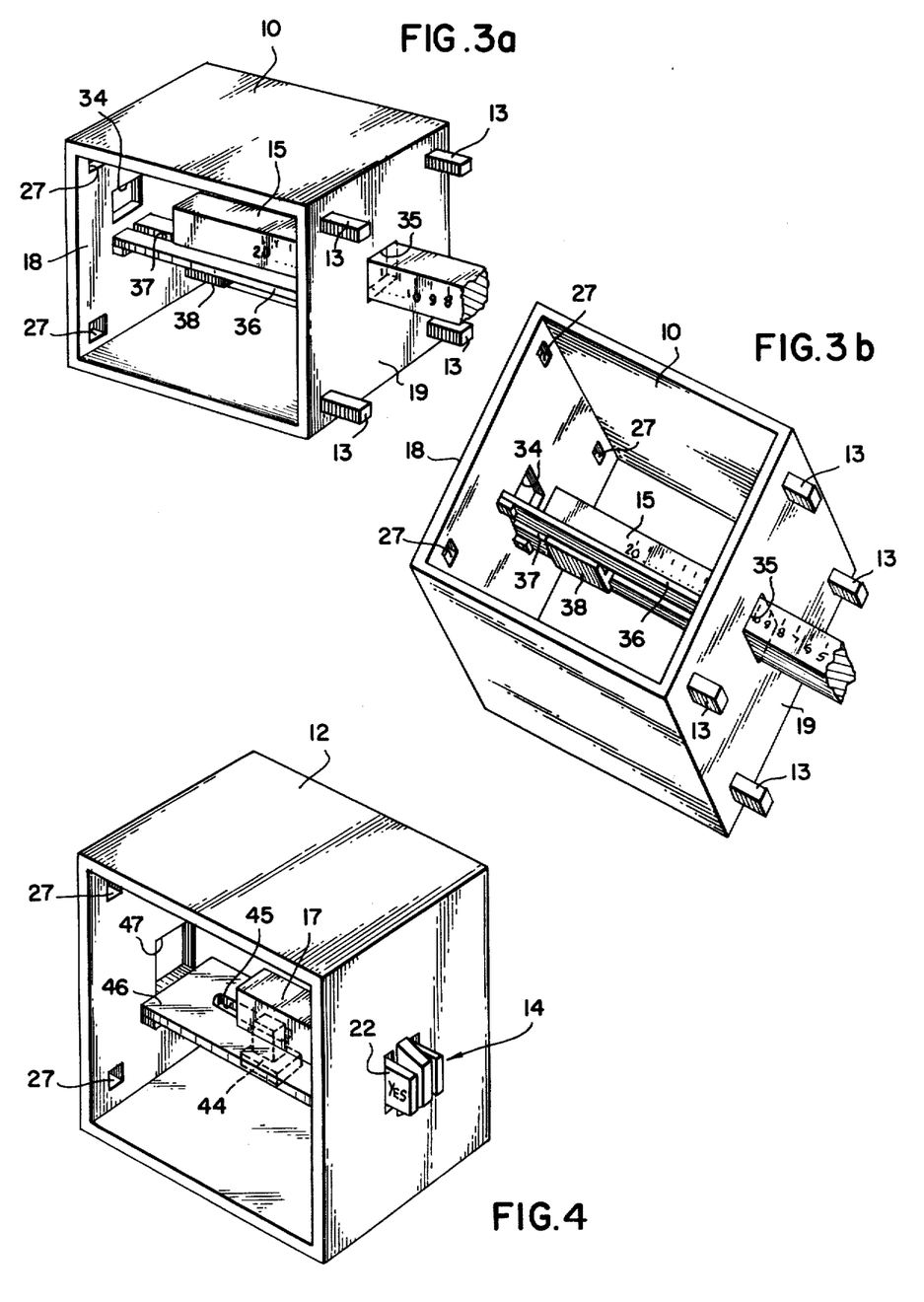
FIGS. 3a and 3b are cut-away perspective views showing the interior of an addend block utilized in the system according to the invention.
FIG. 4 is a cut-away perspective view showing the interior of an answer block utilized in the system according to the invention.

The construction of the addend block 10 is more clearly shown in FIGS. 3a and 3b, in which it is seen that the left and right surfaces 18 and 19 are each provided with aligned holes of rectangular cross section 34 and 35 respectively, defining a transverse path for movement of the rod 15 and a rod associated with another addend block therethrough.

The movement of the rod 15 is supported and guided by a flat support member 36 having a longitudinal elongated slot 37 therein. The rod 15 has a rail 38 extending from the bottom thereof and having a t-shaped cross section to engage the slot 37 of the support 36, thus providing sliding movement of the rod 15 with respect to said slot.

When the rod 15 is moved to the left, the left edge of the rail 38 abuts the left side 18 of the block, thus limiting the movement of the left end of the rod 15 so that said end is disposed adjacent the hole 34 and does not extend outside the block. When the rod 15 is at this leftmost position, the right end of said rod protrudes beyond the right side 19 of the block 10 by a distance linearly proportional to the numerical value associated with said block.

FIG. 3b shows the rod 15 at an intermediate position to which it might be moved by engagement with another addend block. The maximum amount by which the right end of the rod 15 can be made to extend from the right surface 19 thereof may have any desired value, limited only by the width of the block.

Multiplication and division operations can be taught by means of the addition and subtraction systems previously described with reference to FIGS. 1a–e and 2a–c respectively, except that arithmetically related dimensions must be made logarithmically proportional to the desired values, rather than linearly proportional thereto. That is, the lengths of the protruding portions of the rods of the addend blocks must be logarithmically proportional to the associated numerical values, and the depth of the recess 25 of the answer block 12 must also be logarthmically proportional to the numerical value represented by said block. For subtraction operations, the length of the rod 32 of the minuend block 30 must be logarithmically proportional to the desire value, as must be the width between the left and right surfaces of the subtrahend block 31.

With such a change from linear to logarithmic proportions of the numerically related dimensions of the blocks, the system of blocks shown in FIGS. 1a–1e can be utilized for multiplication, and the system of blocks shown in FIGS. 2a to 2c can be utilized for division. In efect, the systems of blocks function as very simplified slide rules in these multiplication and division arrangements.

Figures 5A, 5B, 6:
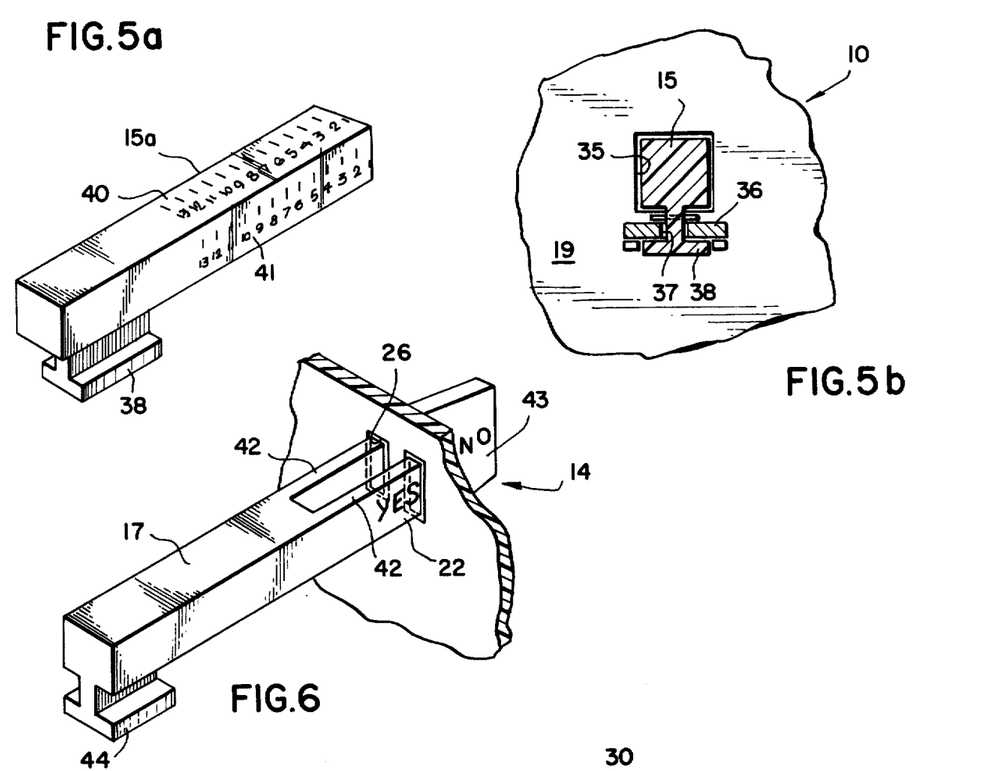
FIGS. 5a and 5b are perspective and end views respectively of the rod utilized in the addend or multiplicand blocks according to the invention.
FIG. 6 is a perspective view of the flag member and indicating means utilized in an answer block according to the invention.

FIG. 5a shows an addend block rod 15a with associated rail 38, with a linear scale 40 facilitating use of the rod for addition, and a logarithmic scale 41 facilitating use of the rod for multiplication.

FIG. 5b shows a cross-sectional view of the rod 15 in engagement with the slot 37 of the support 36, within the block 10.

A more detailed illustration of the flag member 17 of the answer block 12 appears in FIG. 6, in which it is seen that the flag member 17 has a forked end with two tines 42 positioned to straddle a stationary "no" member 43 affixed to the right surface 26 of the corresponding answer block when the flag member 17 is pushed to the right by contact with a rod of an adjacent block extending into the recess of the answer block in which the flag member 17 is situated.

Figures 7, 8:
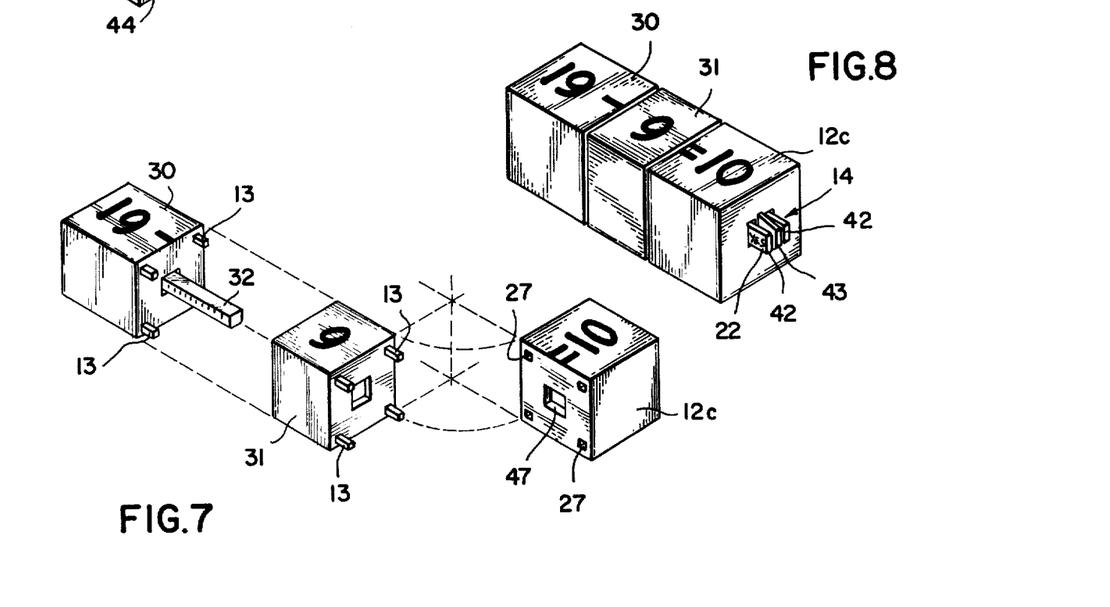
FIG. 7 is a partially cut-away perspective view showing adjacent minuend, subtrahend and answer blocks according to the system of the invention.
FIG. 8 is a partially cut-away perspective view showing the blocks of FIG. 7 in mutually engaged relationship.

FIG. 7 shows the manner in which minuend, subtrahend and answer blocks 30, 31 and 12c are to be assembled to make a correct arithmetic subtraction statement, i.e. $19-9=10$, with the subtrahend and answer blocks shown with the front surfaces thereof removed. FIG. 8 shows these blocks in mutual engagement, wherein it is seen that a "yes" symbol of the answer block has been pushed beyond the right surface of the answer block to straddle the fixed "no" symbol and indicate that the blocks have been correctly assembled to make a true arithmetic subtraction statement.

As best seen in FIG. 4, sliding movement of the flag member 17 of the answer block 12 is provided by engagement of the t-shaped rail 44 thereof with a slot 45 of the flat support 46. The length of the slot 45 is such that the range of linear movement of the flag member 17 corresponds to approximately one arithmetic unit. The hole 47 in the left side of the block permits the rod of another block to enter the answer block and engage the flag member 17.

Preferably, a large number of the various types of blocks described above is provided, so that a child to be taught arithmetic may select various combinations of blocks, and immediately learn whether he has made an arithmetically correct statement, by determining whether or not the blocks fit together with their adjacent surfaces in mutual contact and the "yes" symbol is visibly displayed at the right of the answer block.

An addend block corresponding to the value 0 has a rod 15 the ends of which are initially coplanar with the left and right sides 18 and 19 of said block respectively. A 0 value minuend block simply has a flat right surface 33, without any rod 32 extending therefrom. A 0 value subtrahend block could be represented merely by a thin sheet having holes therein through which the rod 32 and pegs 13 of a minuend block 30 may extend. A 0 value answer block would have the left end of the flag member 17 thereof initially extending one arithmetic unit outwardly from the left side 24 thereof.

What is claimed is:

1. A system of interactive blocks for teaching arithmetic, comprising:
 a plurality of addend blocks each having:
  first and second spaced parallel exterior surfaces and a hole extending through said block between said surfaces;
  an elongated rod mounted within said hole for linear movement in a direction transverse to said surfaces;
  means for limiting the movement of said rod so that when one end of said rod is adjacent said first surface the other end thereof extends outwardly from said second surface a predetermined distance linearly proportional to a first numerical value, and so that said one end of said rod is movable only between said surfaces;
 a plurality of answer blocks each having:

a pair of spaced exterior surfaces and an elongated recess communicating with a selected one of said surfaces;

a displaceable flag member disposed in said recess and mounted for movement in response to entry of one of said rods a given distance into said recess linearly proportional to a given numerical value;

visible means for indicating the position of said flag member;

means for preventing said one rod from extending into said recess a distance greater that said given distance; and indexing means on said first, second and selected surfaces of said addend and answer blocks respectively for maintaining adjacent ones of said surfaces with the holes and recesses thereof in mutual alignment.

2. The system according to claim 1, wherein said addend blocks have the shape of rectangular prisms.

3. The system according to claim 1, further comprising a fixed rod supporting member within each of said addend blocks, said rod having a rail extending therefrom for slidably engaging a slot in said supporting member.

4. A system of interactive blocks for teaching arithmetic, comprising:

a plurality of multiplier blocks each having:

first and second spaced parallel exterior surfaces and a hole extending through said block between said surfaces;

an elongated rod mounted within said hole for linear movement in a direction transverse to said surfaces;

means for limiting the movement of said rod so that when one end of said rod is adjacent said first surface the other end thereof extends outwardly from said second surface a predetermined distance logarithmically proportional to a predetermined numerical value, and so that said one end of said rod is movable only between said surfaces;

a plurality of answer blocks each having:

a pair of spaced exterior surfaces and an elongated recess communicating with a selected one of said surfaces;

a displaceable flag member disposed in said recess and mounted for movement in response to entry of one of said rods a given distance into said recess, logarithmically proportional to a given numerical value;

visible means for indicating the position of said flag member;

means for preventing said one rod from extending into said recess a distance greater than said given distance; and indexing means on said first, second and selected surfaces of said addend and answer blocks respectively for maintaining adjacent ones of said surfaces with the holes and recesses thereof in mutual alignment.

5. The system according to claim 4, wherein said multiplier blocks have the shape of rectangular prisms.

6. The system according to claim 4, further comprising a fixed rod supporting member within each of said multiplier blocks, said rod having a rail extending therefrom for slidably engaging a slot in said supporting member.

7. A system of interactive blocks for teaching arithmetic, comprising a plurality of minuend blocks each having an elongated rod extending from a given surface thereof a first predetermined distance linearly proportional to a first numerical value;

a plurality of subtrahend blocks each having parallel first and second spaced exterior surfaces and a hole extending through said subtrahend block between said surfaces, the width of said subtrahend block between said surfaces being linearly proportional to a second numerical value;

a plurality of answer blocks each having:

a pair of spaced exterior surfaces and an elongated recess communicating with a selected one of said pair of surfaces;

a displaceable flag member disposed in said recess and mounted for movement in response to entry of one of said rods a given distance into said recess linearly proportional to a given numerical value;

visible means for indicating the position of said flag member;

means for preventing said one rod from extending into said recess a distance greater than said given distance; and indexing means on said given, first, second and selected surfaces of said minuend, subtrahend and answer blocks respectively for maintaining adjacent ones of said surfaces with the rods, holes and recesses thereof in mutual alignment.

8. A system of interactive blocks for teaching arithmetic, comprising:

a plurality of dividend blocks each having an elongated rod extending from a given surface thereof a first predetermined distance linearly proportional to a first numerical value;

a plurality of divisor blocks each having parallel first and second spaced exterior surfaces and a hole extending through said divisor block between said surfaces, the width of said divisor block between said surfaces being logarithmically proportional to a second numerical value;

a plurality of answer blocks each having:

a pair of spaced exterior surfaces and an elongated recess communicating with a selected one of said pairs of surfaces;

a displaceable flag member disposed in said recess and mounted for movement in response to entry of one of said rods a given distance into said recess logarithmically proportional to a given numerical value;

visible means for indicating the position of said flag member;

means for preventing said one rod from extending into said recess a distance greater than said given distance; and indexing means on said given, first, second and selected surfaces of said dividend, divisor and answer blocks respectively for maintaining adjacent ones of said surfaces with the rods, holes and recesses thereof in mutual alignment.

9. The system according to claim 1, 4, 7 or 8 wherein said flag member comprises a bar mounted for sliding movement in a direction transverse to said selected surface.

10. The system according to claim 9, wherein said bar has a forked end adjacent the surface of said pair other than said selected surface, said other surface having a fixed indicator extending outwardly therefrom, said forked end having a first position within said answer block, and a second position extending outwardly from said answer block and straddling said fixed indicator.

11. The system according to claim 1 or 4, further comprising spring means for urging said one end of said rod toward said first surface.

12. The system according to claim 1, 4, 7 or 8, further comprising spring means for urging said flag member toward said selected surface of said answer block.

13. The system according to claim 1, 4, 7 or 8, wherein said indexing means includes detent means for maintaining adjacent ones of said surfaces in mutual engagement.

* * * * *